(12) United States Patent
Liu et al.

(10) Patent No.: US 10,690,161 B2
(45) Date of Patent: Jun. 23, 2020

(54) RIVETING STRUCTURE AND RIVETING METHOD

(71) Applicants: LITE-ON ELECTRONICS (GUANGZHOU) LIMITED, Guangzhou (CN); LITE-ON TECHNOLOGY CORPORATION, Taipei (TW)

(72) Inventors: Yung-Lung Liu, Taipei (TW); Chung-Nan Lin, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 8 days.

(21) Appl. No.: 16/038,222

(22) Filed: Jul. 18, 2018

(65) Prior Publication Data

US 2019/0316615 A1    Oct. 17, 2019

(30) Foreign Application Priority Data

Apr. 12, 2018   (CN) .......................... 2018 1 0336429

(51) Int. Cl.
    *F16B 5/04*          (2006.01)
    *B21D 39/03*       (2006.01)
    *F16B 5/00*          (2006.01)

(52) U.S. Cl.
    CPC ............ *F16B 5/045* (2013.01); *B21D 39/032* (2013.01); *F16B 5/0096* (2013.01)

(58) Field of Classification Search
    CPC ... B21D 39/031; B21D 39/032; F16B 37/062; F16B 5/045; F16B 5/0096; Y10T 403/4966; Y10T 29/49908; B21J 15/025
    See application file for complete search history.

(56) References Cited

U.S. PATENT DOCUMENTS

| | | | |
|---|---|---|---|
| 8,248,768 B2 * | 8/2012 | Shen ...................... | G03B 17/02 361/679.01 |
| 2009/0196678 A1 * | 8/2009 | Babej .................... | F16B 37/062 403/19 |

* cited by examiner

*Primary Examiner* — Lee A Holly
(74) *Attorney, Agent, or Firm* — McClure, Qualey & Rodack, LLP

(57) ABSTRACT

A riveting structure and a riveting method are provided. The riveting structure includes a first metal element and a second metal element. The first metal element includes a first upper surface, a pressure-receiving portion and a recess portion. The recess portion is recessed from the first upper surface. The pressure-receiving portion is protruded from a surface of the recess portion. The second metal element includes a second lower surface and a protrusion portion and has a through hole. The protrusion portion is protruded from the second lower surface and correspondingly disposed in the recess portion. The through hole penetrates the second metal element via a central part of the protrusion portion. The pressure-receiving portion is correspondingly received in the through hole and is adapted to be pressed and deformed to be riveted to the through hole.

16 Claims, 4 Drawing Sheets

RIVETING STRUCTURE AND RIVETING METHOD

This application claims the benefit of People's Republic of China Application No. 201810336429.6, filed Apr. 12, 2018, the disclosure of which is incorporated by reference herein in its entirety.

TECHNICAL FIELD

The invention relates in general to a riveting structure and a riveting method, and more particularly to a riveting structure and a riveting method used for riveting two metal elements.

BACKGROUND

During the fabrication of a product, some coupling methods may be used to couple two work pieces together. For example, work pieces formed of the same or different materials can be coupled by way of screw fastening, riveting, or welding.

Although the above coupling methods can be used for coupling two metal work pieces together, manufacturing costs, such as labor, equipment and time, cannot be effectively reduced.

SUMMARY

The invention is directed to a riveting structure and a riveting method. The riveting structure includes two metal elements. The two metal elements may be provided with a structure that can be riveted together and is easy to be riveted together to reduce the manufacturing cost.

According to one embodiment, a riveting structure is provided. The riveting structure includes a first metal element and a second metal element. The first metal element includes a first upper surface, a pressure-receiving portion and a recess portion. The recess portion is recessed from the first upper surface. The pressure-receiving portion is protruded from a surface of the recess portion. The second metal element includes a second lower surface and a protrusion portion and has a through hole. The protrusion portion is protruded from the second lower surface and correspondingly disposed in the recess portion. The through hole penetrates the second metal element via a central part of the protrusion portion. The pressure-receiving portion is correspondingly received in the through hole and is adapted to be pressed and deformed to be riveted to the through hole.

According to another embodiment, a riveting method is provided. The riveting method includes following steps: providing a first metal element including a first upper surface, a pressure-receiving portion and a recess portion, wherein the recess portion is recessed from the first upper surface, and the pressure-receiving portion is protruded from a surface of the recess portion; providing a second metal element including a second lower surface and a protrusion portion and having a through hole, wherein the protrusion portion is protruded from the second lower surface, and the through hole penetrates the second metal element via a central part of the protrusion portion; correspondingly disposing the protrusion portion of the second metal element in the recess portion of the first metal element, wherein the pressure-receiving portion of the first metal element is correspondingly received in the through hole of the second metal element; and applying a force to the pressure-receiving portion by a punch-riveting device for deforming and riveting the pressure-receiving portion to the through hole.

The above and other aspects of the invention will become better understood with regard to the following detailed description of the preferred but non-limiting embodiment(s). The following description is made with reference to the accompanying drawings.

DETAILED DESCRIPTION

The invention relates to a riveting structure and a riveting method. In some embodiments, the riveting structure includes a first metal element and a second metal element. The two elements may be provided with a structure that can be riveted together and is easy to be riveted together without using extra elements as riveting media. The riveting structure can be manufactured by molding, hence saving manufacturing costs such as labor and time.

It should be noted that although the present invention does not illustrate all possible embodiments, other embodiments not disclosed in the present invention are still applicable. Moreover, the dimension scales used in the accompanying drawings are not based on actual proportion of the product. Therefore, the specification and drawings are for explaining and describing the embodiment only, not for limiting the scope of protection of the present invention. Furthermore, descriptions of the embodiments, such as detailed structures, manufacturing procedures and materials, are for exemplification purpose only, not for limiting the scope of protection of the present invention. Suitable modifications or changes can be made to the structures and procedures of the embodiments to meet actual needs without breaching the spirit of the present invention. Designations common to the accompanying drawings are used to indicate identical or similar elements.

Figure 1:
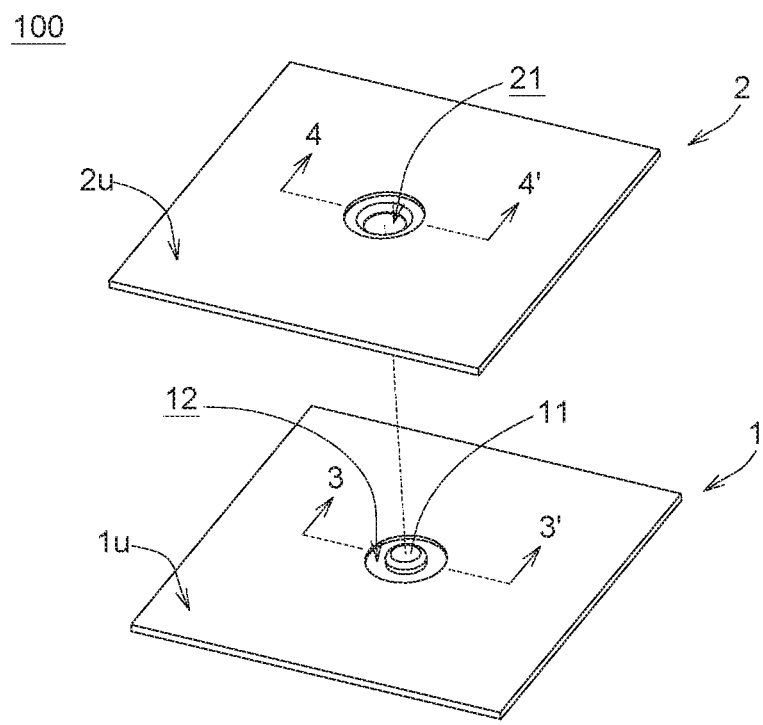
FIG. 1 is an exploded diagram of a riveting structure before being riveted in a top view according to one embodiment of the present invention.
Figure 2:
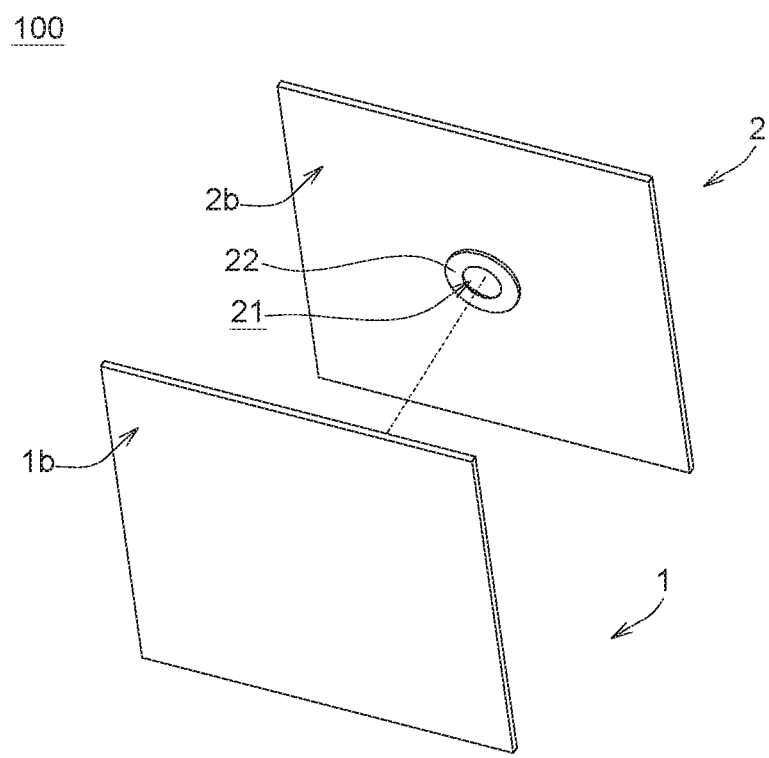
FIG. 2 is an exploded diagram of the riveting structure of FIG. 1 before being riveted in a bottom view.

FIG. 1 is an exploded diagram of a riveting structure 100 before being riveted in a top view according to one embodiment of the present invention. FIG. 2 is an exploded diagram of the riveting structure 100 of FIG. 1 before being riveted in a bottom view.

Refer to FIG. 1 and FIG. 2. The riveting structure 100 includes a first metal element 1 and a second metal element 2. The first metal element 1 includes a first upper surface 1$u$ (See FIG. 1) and a first lower surface 1$b$ (See FIG. 2), which are two opposite surfaces of the first metal element 1 respectively. The second metal element 2 includes a second upper surface 2u (See FIG. 1) and a second lower surface 2b (See FIG. 2), which are two opposite surfaces of the second metal element 2 respectively.

Figure 3:
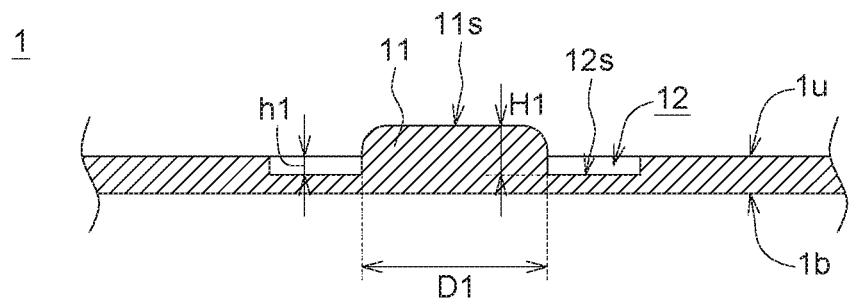
FIG. 3 is a cross-sectional view of the riveting structure of FIG. 1 along a cross-sectional line 3-3'.

The first metal element 1 further includes a pressure-receiving portion 11 and a recess portion 12. Referring to FIG. 3, a cross-sectional view of the riveting structure 100 of FIG. 1 along a cross-sectional line 3-3' is shown. As indicated in FIG. 3, the recess portion 12 is a space recessed downwardly from the first upper surface 1u of the first metal element 1 and has a surface 12s. The pressure-receiving portion 11 is a solid protrusion, such as a solid cylinder, protruded upwardly from the surface 12s of the recess portion 12. Besides, the pressure-receiving portion 11 is further protruded over the first upper surface 1u of the first metal element 1. Here, the first metal element 1 may be provided, for example, by mold pressurization, but the invention is not limited thereto.

Figure 4:
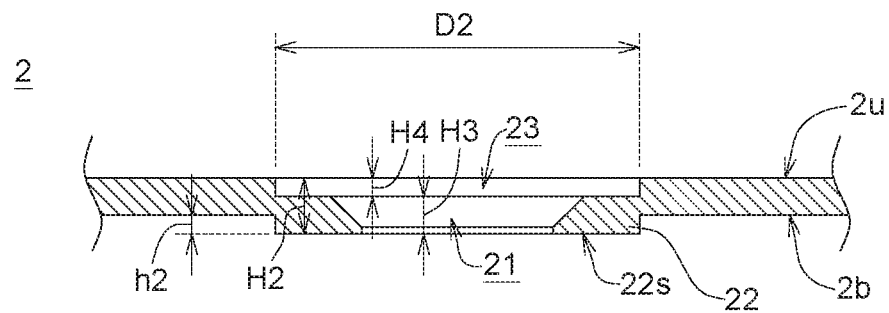
FIG. 4 is a cross-sectional view of the riveting structure of FIG. 1 along a cross-sectional line 4-4'.

As indicated in FIG. 1 and FIG. 2, the second metal element 2 further includes a protrusion portion 22 and has a through hole 21. Referring to FIG. 4, a cross-sectional view of the riveting structure 100 of FIG. 1 along a cross-sectional line 4-4' is shown. As indicated in FIG. 4, the protrusion portion 22 is protruded downwardly from the second lower surface 2b of the second metal element 2 and has a surface 22s. The through hole 21 upwardly penetrates the second metal element 2 via the central part of the protrusion portion 22. Here, the second metal element 2 may be provided, for example, by mold pressurization, and the through hole 21 may be formed by machining, but the invention is not limited thereto.

The size of the aperture of the through hole 21 may vary with the depth of the through hole 21. As indicated in FIG. 4, the through hole 21 may have a smaller aperture at the side of the surface 22s of the protrusion portion 22, and the farther away from the surface 22s of the protrusion portion 22, the larger the aperture. That is, the size of the aperture of the through hole 21 gradually increases from the surface 22s of the protrusion portion 22.

The protrusion portion 22 of the second metal element 2 may be disposed correspondingly to the recess portion 12 of the first metal element 1. For example, the location and/or shape of the protrusion portion 22 may correspond to that of the recess portion 12. In one embodiment, as indicated in FIG. 1, the recess portion 12 of the first metal element 1 may form an annular ring surrounding the pressure-receiving portion 11, and therefore, the recess portion 12 may form an annular accommodation space surrounding the pressure-receiving portion 11. On the other hand, as indicated in FIG. 2, the protrusion portion 22 of the second metal element 2 may correspond to the recess portion 12 of the first metal element 1 and form an annular ring surrounding the through hole 21. Thus, the protrusion portion 22 may form an annular flange surrounding the through hole 21.

Refer to FIG. 3 and FIG. 4. The recess portion 12 has a depth h1. In other words, h1 may also denote the distance from the first upper surface 1u of the first metal element 1 to the surface 12s of the recess portion 12. The protrusion portion 22 has a height h2. In other words, h2 may also denote the distance from the second lower surface 2b of the second metal element 2 to the surface 22s of the protrusion portion 22. In some embodiments, the depth h1 may satisfy: 0.2 mm≤h1≤0.4 mm, and/or the height h2 may satisfy: 0.2 mm≤h2≤0.4 mm. Thus, the protrusion portion 22 may correspond to the recess portion 12. Therefore, when the protrusion portion 22 is correspondingly disposed in the recess portion 12, the first upper surface 1u of the first metal element 1 may be attached to the second lower surface 2b of the second metal element 2. Meanwhile, the pressure-receiving portion 11 of the first metal element 1 may also be correspondingly received in the through hole 21 of the second metal element 2.

When the first metal element 1 and the second metal element 2 are going to be riveted together, the alignment step of the first metal element 1 and the second metal element 2 may be performed first. In the alignment step, the protrusion portion 22 of the second metal element 2 may be correspondingly disposed in the recess portion 12 of the first metal element 1, such that the pressure-receiving portion 11 of the first metal element 1 may be correspondingly received in the through hole 21 of the second metal element 2.

Figure 5:
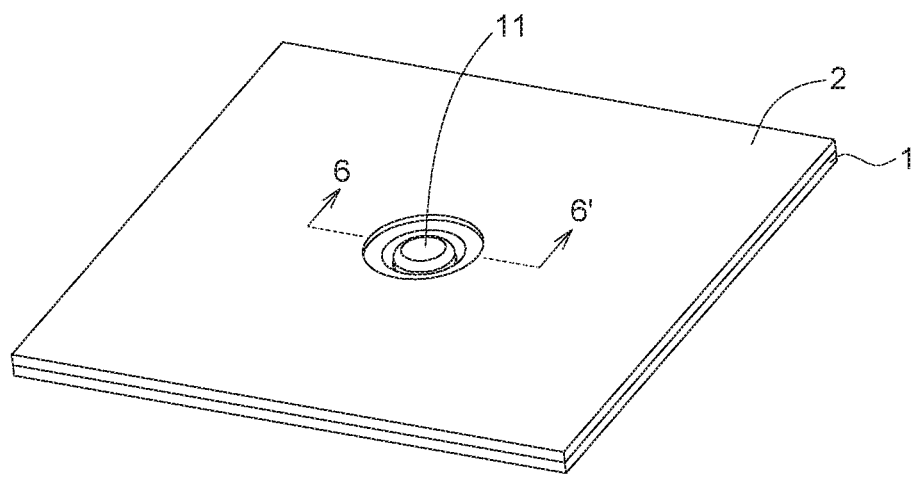
FIG. 5 is a 3D diagram of the riveting structure of FIG. 1 before being riveted.
Figure 6:
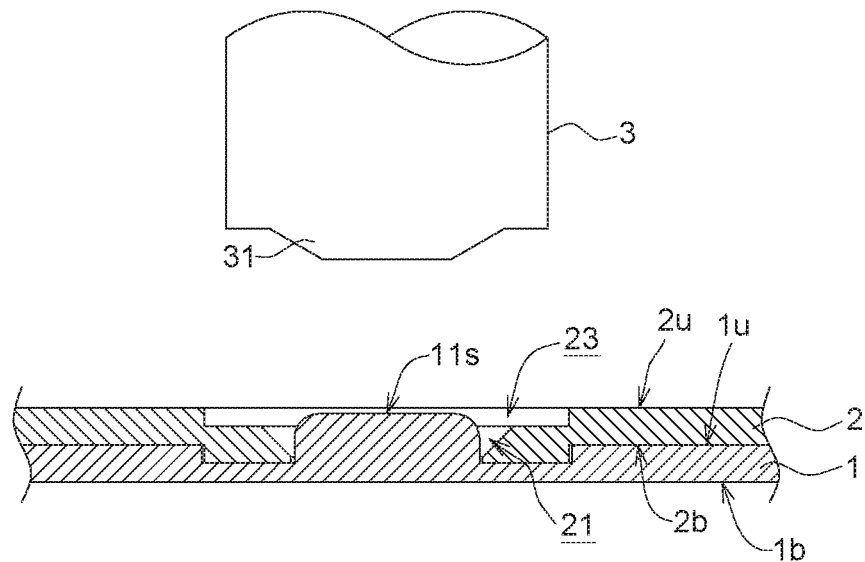
FIG. 6 is a cross-sectional view along a cross-sectional line 6-6' of FIG. 5, showing that the riveting structure is going to be riveted by a punch-riveting device.

FIG. 5 is a 3D diagram of the riveting structure 100 of FIG. 1 before being riveted. FIG. 6 a cross-sectional view along a cross-sectional line 6-6' of FIG. 5, showing that the riveting structure 100 is going to be riveted by a punch-riveting device 3.

Refer to FIG. 5 and FIG. 6. After the alignment step of the first metal element 1 and the second metal element 2 is completed, the first upper surface 1u of the first metal element 1 may be attached to the second lower surface 2b of the second metal element 2, and the pressure-receiving portion 11 of the first metal element 1 is exposed from the through hole 21 of the second metal element 2.

Then, the riveting step of the first metal element 1 and the second metal element 2 may be performed. In the riveting step, a punch-riveting device 3 may apply a force to the pressure-receiving portion 11 of the first metal element 1. Meanwhile, the recess portion 12 of the first metal element 1 and the protrusion portion 22 of the second metal element 2 may together provide a positioning function. Therefore, when the punch-riveting device 3 applies a force to the pressure-receiving portion 11, the first metal element 1 and the second metal element 2 will not be misplaced and affect the riveting effect.

Figure 7:
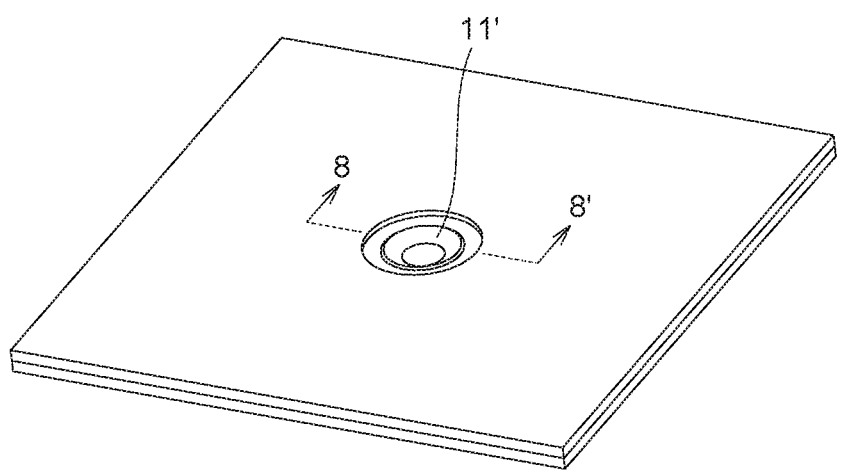
FIG. 7 is a 3D diagram of the riveting structure of FIG. 1 after being riveted.
Figure 8:
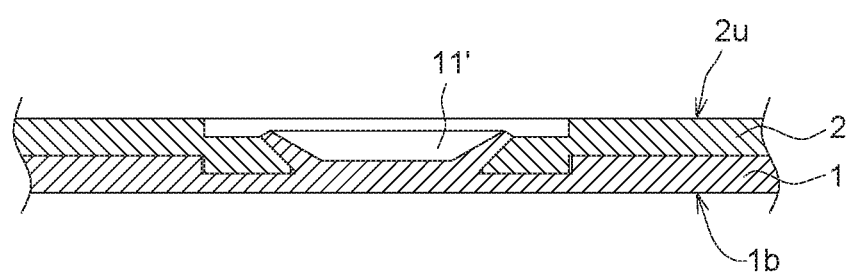
FIG. 8 is a cross-sectional view of the riveting structure of FIG. 7 along a cross-sectional line 8-8'.

When the punch-riveting device 3 applies a force to the pressure-receiving portion 11, the pressure-receiving portion 11 deforms to be riveted to the through hole 21. Refer to FIG. 7 and FIG. 8. FIG. 7 is a 3D diagram of the riveting structure 100' of FIG. 1 after being riveted. FIG. 8 is a cross-sectional view of the riveting structure 100' of FIG. 7 along a cross-sectional line 8-8'. As indicated in FIG. 7 and FIG. 8, when the deformed pressure-receiving portion 11' is engaged with the sidewall of the through hole 21 (See the reference sign in FIG. 4 and FIG. 6), the first metal element 1 and the second metal element 2 may be firmly bonded together. Particularly, when the deformed pressure-receiving portion 11' is engaged with the sidewall of the through hole 21, the pressure-receiving portion 11' will not be protruded over the second upper surface 2u of the second metal element 2. In addition, no significant protrusion will be formed on the first lower surface 1b of the first metal element 1.

Refer to FIG. 3, FIG. 4 and FIG. 6. In one embodiment, the second metal element 2 may further have a recessed space 23 recessed downwardly from the second upper surface 2u of the second metal element 2. Moreover, the recessed space 23 is interconnected with the through hole 21, such that the through hole 21 and the recessed space 23 may penetrate the second metal element 2.

After the alignment step of the first metal element 1 and the second metal element 2 is completed, the pressure-receiving surface 11s of the pressure-receiving portion 11 of the first metal element 1 is lower than the second upper surface 2u of the second metal element 2. Furthermore, the pressure-receiving surface 11s of the pressure-receiving portion 11 is located in the recessed space 23. That is, the height H1 of the pressure-receiving portion 11 is smaller than the height H2 from the surface 22s of the protrusion portion 22 of the second metal element 2 to the second upper surface 2u (that is, the depth formed by both of the recessed space 23 and the through hole 21), but is larger than the depth H3 of the through hole 21. The depth H4 of the recessed space 23 is substantially equivalent to the difference between the height H2 and the height H3.

Besides, the maximum diameter of the pressure-receiving portion 11 may be commensurate with the minimum aperture of the through hole 21. That is, the maximum diameter of the pressure-receiving portion 11 may be equivalent to or slightly smaller than the minimum aperture of the through hole 21. In some embodiments, the pressure-receiving portion 11 has a diameter D1, the recessed space 23 has a diameter D2, and diameter D1 is smaller than diameter D2. In some embodiments, the diameter D2 may satisfy: 4.0 mm≤D2≤7.0 mm. In the above embodiments, the diameter of the recessed space 23 is between 4.0 mm-7.0 mm. In comparison to other types of riveting structures, the riveting structure 100 of the present embodiment not only provides a stable riveting effect but also has the advantage of miniaturization.

The punch-riveting device 3 may further reach the recessed space 23 defined by the depth H4 and diameter D2, and therefore may apply a force to the pressure-receiving portion 11 only by a indenter 31 without applying the force to the other structure. Through the above design of receiving the force applied to a small area of surface 11s of the pressure-receiving portion 11 defined by the height H1 and the diameter D1 from the indenter 31, the force received at the contact surface (that is, the surface 11s of the pressure-receiving portion 11) may be reduced. The design of the present invention may avoid the first metal element 1 and the second metal element 2 receiving too much force and becoming deformed, and further avoid protrusions being generated on the first lower surface 1b of the first metal element 1. In the embodiments of the present invention, no significant protrusions will be generated on the first lower surface 1b of the first metal element 1. For those products requiring higher standard of exterior appearance, the first lower surface 1b of the first metal element 1 may further be served as an exterior surface.

Moreover, since the pressure-receiving surface 11s of the pressure-receiving portion 11 is located in the recessed space 23, the volume of the pressure-receiving portion 11 may be smaller than the sum of the volume of the through hole 21 and the volume of the recessed space 23, or the diameter D1 is smaller than diameter D2 and the height H1 is smaller than the height H2, it may be assured that the deformed pressure-receiving portion 11' will not be protruded over the second upper surface 2u of the second metal element 2. Thus, when the second upper surface 2u of the second metal element 2 is further served as an interior surface of those products having a higher density of elements (such as some electronic products), an interior surface being free of foreign bodies may be conducive to the assembly of the internal elements of the products.

The riveting structure and the riveting method provided above do not need extra elements as riveting media, and may be manufactured by molding, hence saving manufacturing costs such as labor and time.

The riveting structure includes a first metal element and a second metal element. The first metal element includes a pressure-receiving portion. The second metal element includes a through hole. The pressure-receiving portion is correspondingly received in the through hole and is adapted to be pressed and deformed to be riveted to the through hole. Moreover, the first metal element and the second metal element further include a recess portion and a protrusion portion disposed correspondingly. In the riveting step, the recess portion and the protrusion portion may provide a positioning function to avoid the first metal element and the second metal element being misplaced and affecting the riveting effect.

In some embodiments, the second metal element further has a recessed space in which the pressure-receiving surface of the pressure-receiving portion is located. Moreover, during the riveting step, the punch-riveting device may apply a force to the pressure-receiving portion only by an indenter without applying the force to other structure. The design of the invention may avoid the first metal element and the second metal element receiving too much force and becoming deformed, and further avoid protrusions being generated on the first lower surface of the first metal element. Thus, the first lower surface of the first metal element may further be served as an exterior surface of the products. Besides, since the deformed pressure-receiving portion is not be protruded over the second upper surface of the second metal element, the second metal element is free of foreign bodies on the second upper surface. Thus, it is conducive to the assembly of internal elements when the second upper surface of the second metal element is served as an interior surface of the products.

It will be apparent to those skilled in the art that various modifications and variations can be made to the disclosed embodiments. It is intended that the specification and examples be considered as exemplary only, with a true scope of the invention being indicated by the following claims and their equivalents.

What is claimed is:

1. A riveting structure comprising:
    a first metal element comprising a first upper surface, a pressure-receiving portion and a recess portion, wherein the recess portion is recessed from the first upper surface, and the pressure-receiving portion is protruded from a surface of the recess portion; and
    a second metal element comprising a second lower surface and a protrusion portion and having a through hole, wherein the protrusion portion is protruded from the second lower surface and correspondingly disposed in the recess portion, and the through hole penetrates the second metal element corresponding to a central part of the protrusion portion;
    wherein the pressure-receiving portion is correspondingly received in the through hole and is adapted to be pressed and deformed to be riveted to a sidewall of the through hole of the second metal element, and no through hole is formed in the first metal element at a position corresponding to the through hole of the second metal element.

2. The riveting structure according to claim 1, wherein the second metal element further comprises a second upper surface, and further has a recessed space recessed from the second upper surface and interconnected with the through hole.

3. The riveting structure according to claim 2, wherein when the pressure-receiving portion is correspondingly received in the through hole, a pressure-receiving surface of the pressure-receiving portion is lower than the second upper surface.

4. The riveting structure according to claim 3, wherein when the pressure-receiving portion is correspondingly received in the through hole, the pressure-receiving surface of the pressure-receiving portion is located in the recessed space.

5. The riveting structure according to claim 2, wherein the pressure-receiving portion has a diameter D1, the recessed space has a diameter D2, and D1 is smaller than D2.

6. The riveting structure according to claim 5, wherein the diameter D2 satisfies: 4.0 mm≤D2≤7.0 mm.

7. The riveting structure according to claim 2, wherein the pressure-receiving portion has a height H1, a height H2 is from a surface of the protrusion portion to the second upper surface, and H1 is smaller than H2.

8. The riveting structure according to claim 2, wherein the through hole has an aperture gradually increasing along a direction from a bottom surface of the protrusion portion to the second upper surface of the second metal element.

9. The riveting structure according to claim 2, wherein the pressure-receiving portion is riveted to the sidewall of the through hole rather than being riveted to a sidewall of the recessed space.

10. The riveting structure according to claim 1, wherein the recess portion forms an annular ring surrounding the pressure-receiving portion, and the protrusion portion forms an annular ring surrounding the through hole.

11. The riveting structure according to claim 1, wherein a maximum diameter of the pressure-receiving portion is commensurate with a minimum aperture of the through hole.

12. A riveting structure comprising:
a first metal element comprising a first upper surface, a pressure-receiving portion and a recess portion, wherein the recess portion is recessed from the first upper surface, and the pressure-receiving portion is protruded from a surface of the recess portion; and
a second metal element comprising a second lower surface, a second upper surface opposite to the second lower surface and a protrusion portion and having a through hole and a recessed space recessed from the second upper surface and interconnected with the through hole;
wherein the protrusion portion is protruded from the second lower surface and correspondingly disposed in the recess portion, and the through hole penetrates the second metal element corresponding to a central part of the protrusion portion;
wherein the pressure-receiving portion of the first metal element is riveted to a sidewall of the through hole rather than being riveted to a sidewall of the recessed space.

13. The riveting structure according to claim 12, wherein the through hole has an aperture gradually increasing along a direction from a bottom surface of the protrusion portion to the second upper surface of the second metal element.

14. The riveting structure according to claim 12, wherein a distance from a central axis of the through hole to the sidewall of the recessed space is greater than a distance from the central axis of the through hole to the sidewall of the through hole.

15. A riveting method comprising:
providing a first metal element comprising a first upper surface, a pressure-receiving portion and a recess portion, wherein the recess portion is recessed from the first upper surface, and the pressure-receiving portion is protruded from a surface of the recess portion;
providing a second metal element comprising a second lower surface and a protrusion portion and having a through hole, wherein the protrusion portion is protruded from the second lower surface, and the through hole penetrates the second metal element corresponding to a central part of the protrusion portion;
correspondingly disposing the protrusion portion of the second metal element in the recess portion of the first metal element, wherein the pressure-receiving portion of the first metal element is correspondingly received in the through hole of the second metal element; and
applying a force to the pressure-receiving portion by a punch-riveting device for deforming and riveting the pressure-receiving portion to the sidewall of the through hole, wherein no through hole is formed in the first metal element at a position corresponding to the through hole of the second metal element.

16. The riveting method according to claim 15, wherein:
in the step of providing the second metal element, the second metal element further comprises a second upper surface, and further has a recessed space recessed from the second upper surface and interconnected with the through hole; and
in the step of applying the force to the pressure-receiving portion by the punch-riveting device, the punch-riveting device enters the recessed space and applies the force to the pressure-receiving portion by a indenter.

* * * * *